United States Patent
Augustin et al.

(10) Patent No.: US 7,098,811 B2
(45) Date of Patent: Aug. 29, 2006

(54) METHOD AND APPARATUS FOR TACTILE CUEING OF AIRCRAFT CONTROLS

(75) Inventors: Michael J. Augustin, Fort Worth, TX (US); Allen L. Bertapelle, Arlington, TX (US); Mark E. Dreier, Arlington, TX (US); Bradley D. Linton, Mansfield, TX (US); William L. McKeown, Euless, TX (US); Robert D. Yeary, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 10/508,303

(22) PCT Filed: Mar. 21, 2003

(86) PCT No.: PCT/US03/08998

§ 371 (c)(1),
(2), (4) Date: Mar. 10, 2005

(87) PCT Pub. No.: WO03/081554

PCT Pub. Date: Oct. 2, 2003

(65) Prior Publication Data

US 2005/0151672 A1   Jul. 14, 2005

(51) Int. Cl.
*G08B 23/00* (2006.01)
(52) U.S. Cl. ............... 340/965; 244/223; 340/946
(58) Field of Classification Search ........... 340/965, 340/946; 73/178 H; 244/17.11, 223, 234, 244/226, 221, 76 R, 75.2
See application file for complete search history.

(56) References Cited

U.S. PATENT DOCUMENTS

| | | | | |
|---|---|---|---|---|
| 4,513,235 A | * | 4/1985 | Acklam et al. | 318/685 |
| 4,717,098 A | * | 1/1988 | Walker et al. | 244/223 |
| 5,062,594 A | * | 11/1991 | Repperger | 244/175 |
| 5,076,517 A | * | 12/1991 | Ferranti et al. | 244/228 |
| 5,986,582 A | * | 11/1999 | Greene et al. | 340/965 |
| 6,002,349 A | * | 12/1999 | Greene et al. | 340/965 |
| 6,644,600 B1 | * | 11/2003 | Olson et al. | 244/221 |
| 6,695,264 B1 | * | 2/2004 | Schaeffer et al. | 244/223 |

* cited by examiner

Primary Examiner—Brent A. Swarthout
(74) Attorney, Agent, or Firm—James E. Walton

(57) ABSTRACT

A method and apparatus for tactile cueing of aircraft controls (21) is disclosed. The apparatus of the present invention warns pilots of approaching limits on certain aircraft performance parameters. The most common warnings are for rotor speed exceeding a moving limit. The present invention uses tactile cueing through the collective stick (21). Tactile cueing means that the pilot does not need to scan the intruments to ascertain proximity to the aforementioned limits. Instead, the pilot can operate the aircraft within proper limits by touch, while maintaining situational awareness outside of the cockpit (20). The method and apparatus of the present invention provides customary friction resistance up to a limit position that is continuously updated. According to the present invention, continued motion of the collective (21) in a direction beyond that limit position results in a breakout force and an increasing resistive force.

22 Claims, 3 Drawing Sheets

| AIRFRAME | ENGINE | PILOT |
|---|---|---|
| ATTITUDE, ACCELERATIONS, ACTUATOR POSITIONS, SPEED, ALTITUDE | SPOOL SPEEDS, FUEL FLOW, TURBINE TEMPERATURE, ENGINE TORQUE | PILOT CONTROL INPUTS, MASK TORQUE |

METHOD AND APPARATUS FOR TACTILE CUEING OF AIRCRAFT CONTROLS

TECHNICAL FIELD

The present invention relates to aircraft control systems. In particular, the present invention relates to tactile cueing of aircraft control systems.

DESCRIPTION OF THE PRIOR ART

Currently, the only method to monitor engine and rotor performance of a helicopter or other rotorcraft in flight is visually, through the information displayed on various instruments, and/or audibly, with the use of synthesized speech, recorded messages, tones, whistles, etc. These methods require the pilot to scan the instruments or expend cognitive power discerning the intent of the audible feedback. During high workload maneuvers, such as high speed turns and precision hover near external hazards (buildings, vegetation, power lines, etc.), the pilot must maintain his gaze outside of the cockpit. Requiring the pilot to break that gaze to look at an instrument or caution light creates a high risk. Parameter condition is achieved at the expense of aircraft situational awareness. One problem with these monitoring methods is that the pilot must stay informed of certain operating parameters, because exceeding the operational limits of these parameters can lead to significant degradation of aircraft performance and/or failure of vital aircraft components.

Over the years, many different methods have been developed to address this problem. These methods can be categorized broadly into three classes. In the first class, which is most often implemented with fly-by-wire systems, the pilot's control inputs are electronically interrupted, and only as much of the pilot's inputs as are allowed are passed to the control system, so that the aircraft will not exceed any limits when responding. With the methods of this class, the pilot retains full control motion, but his authority is usurped. Therefore, this method does not really address the problem of keeping the pilot informed of proximity to a limit. Instead, it imposes a rigid set of rules that describe the flight envelope.

In the second class of monitoring methods, a tactile cue that retards the motion of the control, referred to as a "hard stop," is provided. Such a hard stop is almost universally rejected.

In the third class of methods, a tactile cue that shakes the control is provided. In these methods, the tactile cue is only a classifier, i.e., either the pilot is violating a limit, or he is not. There is no "leading" information or forewarning. These methods are typically the most easy to implement, but they do not provide any information regarding the degree of limit exceedance.

SUMMARY OF THE INVENTION

There is a need for a tactile cueing system for an aircraft control system that provides limit proximity information to the pilot on a continuous basis, without diverting the pilot's attention from the primary task of flying the aircraft, without interfering with the pilot's control motion, and without artificially changing the sensitivity of the aircraft to the pilot's control inputs.

Therefore, it is an object of the present invention to provide a tactile cueing system for an aircraft control system that provides limit proximity information to the pilot on a continuous basis, without diverting the pilot's attention from the primary task of flying the aircraft, without interfering with the pilot's control motion, and without artificially changing the sensitivity of the aircraft to the pilot's control inputs.

It is another object of the present invention to provide a tactile cueing system for an aircraft control system that can be mechanically and electrically retrofitted to existing aircraft.

It is yet another object of the present invention to provide a tactile cueing system for an aircraft control system that utilizes existing processing and aircraft data resources commonly utilized in Flight Data Recorder (FDR) systems and Health and Usage Monitoring Systems (HUMS).

It is yet another object of the present invention to provide a tactile cueing system for an aircraft control system that allows "eyes-out-the-cockpit" operation during demanding maneuvers utilizing the full torque envelope of an aircraft.

These objects are achieved by providing a simple and cost effective mechanical spring and electric motor system that generates the desired tactile force cueing to the aircraft control system. The method and apparatus for tactile cueing of aircraft controls according to the present invention comprises a parameter prediction and a "soft-stop" tactile cue.

The parameter prediction uses a computer, associated software, and sensors of control position, engine parameters, and rotor performance to predict a future value of certain parameters based upon current values. Any number of algorithms can be applied to the prediction problem, including, but not limited to, Kalman filtering, extended Kalman filtering, linear prediction, trending, multi-variable surface fits of measured data, simple analytical expressions, artificial neural networks, and fuzzy logic. Some of the sensors measure current values of air data, such as airspeed and rate of descent. Other sensors measure performance parameters, such as engine torque, exhaust gas temperature, and rotor speed. Still other sensors measure pilot inputs through control displacement and rate information. All of this sensed data is sent to the aircraft's flight control computers to prepare the data for analysis.

Based on the selected algorithm, the parameter prediction is made of a future value of the desired performance parameters. This predicted value is then passed to a soft-stop cueing algorithm. The soft-stop algorithm is a "floating ground" algorithm that does not require additional sensed positions of either side of the spring cartridge. This reduces the cost of the system and increases reliability by reducing complexity. The use of a stepper motor combines braking capability and precise position control of the "floating ground" side of the spring cartridge without the requirement of additional sensors. Although the present invention is described below with respect to engine torque management, it will be appreciated that the method and apparatus of the present invention may be used to manage other aircraft parameters, such as rotor speed and engine temperature, or any other aircraft operational parameter that requires limiting and/or reducing control inputs.

The soft-stop tactile cue is achieved by use of a force gradient spring cartridge placed in parallel with an existing control linkage. One end of the spring cartridge is attached to the existing control linkage, and the other end of the spring cartridge is attached to an actuator arm of a stepper motor. A microswitch is placed in-line with the spring cartridge to prevent inadvertent stick motion when the predicted torque drops below the limit torque and the stepper motor is ready to return to a free-wheeling mode. Further-more, a stick shaker can be attached to the collective stick to provide an additional tactile cue.

As the pilot operates the collective stick, the existing control linkage drives one end of the spring cartridge. When the aircraft is being operated within its envelope limits, the stepper motor shaft is free to move in either direction as dictated by forces applied to the actuator arm. The forces applied to the actuator arm are those transmitted by the spring cartridge and are due to the motion of the collective. During such time, the actual and predicted values of torque are below the torque limit. However, if the maximum of either the predicted or actual torque exceeds the limit, the software directs these activities.

First, an engage flag for the stepper motor is set true, making the stepper motor act like a magnetic brake. Thus, if the pilot continues pulling up on the collective, the microswitch shows its true state indicating that the spring cartridge is in tension. The spring cartridge then supplies a resistive force consisting of a breakout force and an increasing force proportional to the amount of exceedance. Once the pilot pushes down on the collective releasing the spring tension, the microswitch changes to its false state causing the stepper motor to revert to free-wheeling mode, thereby removing any resistance to corrective action. When the engage flag changes to true, the current location of the collective is recorded and serves as an initial value for both the actual location and the commanded location of the collective stick.

Second, a collective limit position (CLIP) is calculated. This calculation determines where the collective should be so that the torque will just equal the limit at the future time, referred to as the prediction horizon. The CLIP is measured relative to the current location of the collective position, so only a change or delta needs to be calculated. The calculation itself comes from the amount the torque exceeds the limit multiplied by the gain relating inches of collective stick to change in torque. The CLIP is then added to the commanded location for the collective step.

Third, a step command is issued to the stepper motor. If the commanded location is below the actual location, a "down" step is issued. If the commanded location is above the actual location, an "up" step is issued. Coincident commanded and actual location issues a "zero" step. The stepper motor then moves one end of the spring cartridge accordingly. If the pilot maintains just the breakout force on the collective, the stepper motor actually drives the pilot's hand to track exactly the torque limit. If the pilot maintains the collective in one position, he feels the force modulate according to the degree of exceedance.

Fourth, if the exceedance is greater than a selected additional increment above the limit, the stick shaker is activated.

These four evaluations are repeated every computational frame. The exact logic for stepper motor engagement and direction involves a truth table that uses values of torque exceedance, current and previous stepper motor engagement, and state of the microswitch.

An important aspect of the present invention is the fact that the corrective action by the pilot for torque exceedance, rotor droop, and exhaust gas temperature is to push the collective down. In order to cue against a limit exceedance on all of these parameters, the system need only determine if any exceedance exists individually. If so, the system starts the cueing process, then calculates the CLIP for each parameter that is exceeding its limit, and uses the most conservative answer.

Finally, the limits are not constants, but are instead functions of airspeed and other parameters. For instance, the torque limit changes in step fashion at a certain speed, for example $V_q$. In order to prevent a sudden change in cueing force due to a sudden change in limit value, the limit value is slowly changed as a function of airspeed proximity to $V_q$, and the rate at which the airspeed approaches $V_q$.

The present invention provides many significant benefits and advantages, including: (1) the use of electro-hydraulic actuators for inducing control force feel is avoided, resulting in less complexity, more reliability, and lower costs for maintenance and repair; (2) the tactile cueing stimulates a sense that is not already saturated, thereby requiring significantly reduced cognitive effort; (3) an algorithm that continuously updates the limit position of all parameters over which the collective has significant influence is used; (4) pilot intent is not interfered with, so that if a pilot wants to pull through the cue, this system will resist, but not stop that action; (5) the system employs a crisp, unambiguous cue with an optional shaking cue, as opposed to a shaking cue alone; (6) the crisp tactile cues permit more accurate tracking of the limit than do shaking cues; (7) inadvertent over-torque events can be eliminated, while reducing pilot workload; (8) helicopter operational safety is improved by reducing pilot workload associated with avoiding certain operational parameter exceedances during demanding maneuvers; (9) more than one limit can be cued by the collective stick, i.e., rotor speed, engine torque, and exhaust gas temperature; (10) different limits can be fused into one conservative limit that is transmitted to the cueing force controller; (11) "leading" feedback, i.e., the cue the pilot feels is one calculated to prevent a limit exceedance at some future time, usually about a half second in the future, can be provided; (12) existing flight control linkages are retained, as the cueing algorithm uses a minimum of system sensors, and solves the problem of limited bandwidth of the cueing motor; (13) the system can be applied to other aircraft controls, such as the cyclic and pedals; and (14) the system is easily retrofitted to a wide range of existing aircraft.

DESCRIPTION OF THE PREFERRED EMBODIMENT

The method and apparatus of the present invention uses tactile feedback to cue a pilot of impending exceedance of one or more operational parameters of an aircraft. The present invention enables the pilot to maintain "eyes-out-the-window" references during high-workload maneuvering tasks. Although the present invention is described with regard to a helicopter and HUMS parameters, it should be understood that the present invention is not limited to such applications, but may be used as an independent system on any rotorcraft or other aircraft, with or without a HUMS.

As with any helicopter limit cueing system, the cueing required for closed-loop torque management must be timely and unambiguous. Simply introducing a soft-stop at the static collective position where an exceedance is first expected to occur is insufficient due to the false relief cues that may result. For example, if the collective is lowered to relieve the force cue, the aircraft could still be in an exceedance condition due to the application of other control inputs. In other situations, the cueing must be able to adapt to airspeed dependent limits on torque. Additional requirements for helicopter limit cueing systems flow down from safety, certification, performance, and cost and weight considerations, as follows: (1) the soft-stop must not have a failure mode that a pilot cannot overcome with tolerable control forces; (2) the prediction algorithm must provide a suitable lead-time; (3) discontinuous torque limits must not cause discontinuous cueing forces; (4) system costs, including the cost of retrofitting existing aircraft, must be kept to a minimum; and (5) system reliability must be high.

Although the present invention is described below with respect to engine torque management, it will be appreciated that the method and apparatus of the present invention may be used to manage other aircraft parameters, such as rotor speed and engine temperature, or any other aircraft operational parameter that requires limiting and/or reducing control inputs.

Figure 1:
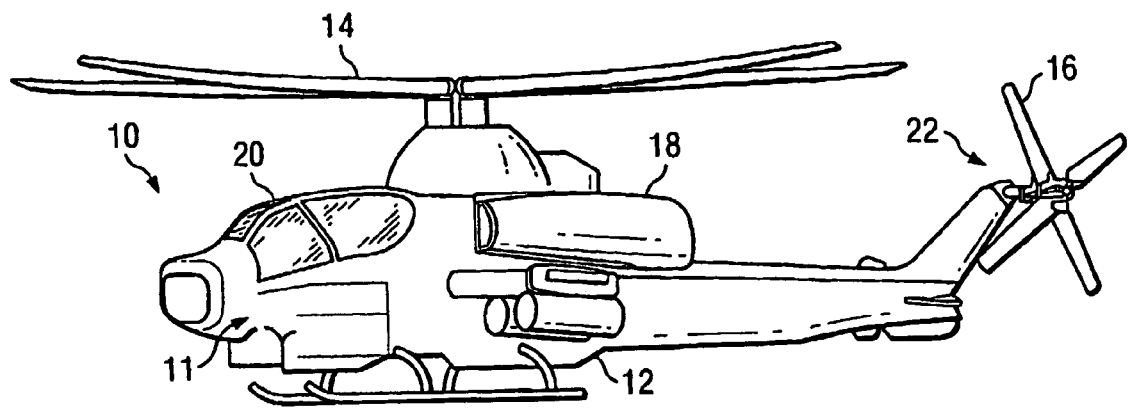
FIG. 1 is a perspective view of an aircraft having a tactile cueing system according to the present invention.

Referring to FIG. 1 in the drawings, an aircraft 10 having a tactile cueing system 11 according to the present invention is illustrated. Although aircraft 10 is shown as a helicopter, it will be appreciated that aircraft 10 may be a fixed wing aircraft, a tilt rotor aircraft, or any other rotorcraft, such as a tilt wing aircraft or a tail sitter aircraft. Aircraft 10 includes a fuselage 12, a drive means 18, and a main rotor 14. Torque imparted to fuselage 12 by main rotor 14 is counter-acted by a tail rotor assembly 16 mounted on a tail portion 22 of fuselage 12. Main rotor 14 and tail rotor assembly 16 are powered by drive means 18 under the control of a pilot in a cockpit 20.

Figure 2:
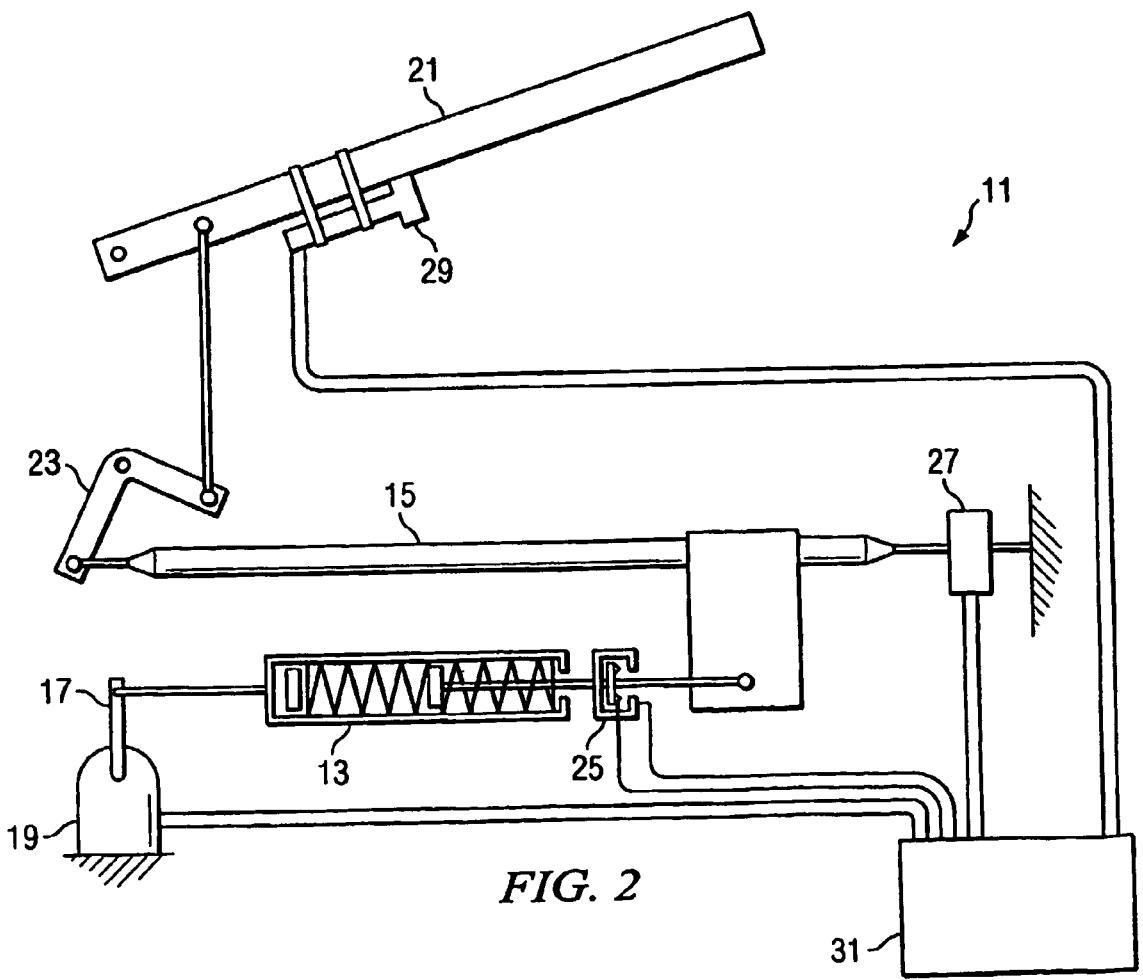
FIG. 2 is a simplified schematic of the tactile cueing system for aircraft controls according to the present invention.

Referring now to FIG. 2 in the drawings, the preferred embodiment of tactile cueing system 11 is illustrated in a simplified schematic. Tactile cueing system 11 includes a force gradient spring cartridge 13 placed in parallel with an existing control linkage 15. One end of spring cartridge 13 is coupled to existing control linkage 15, and the other end of spring cartridge 13 is coupled to an actuator arm 17 of an electric stepper motor 19. Control linkage 15 is coupled to a collective 21 via a mixing lever 23. A switching means, or microswitch 25, is operably associated with spring cartridge 13, preferably by being disposed in-line with spring cartridge 13, to prevent inadvertent motion of collective 21 when the predicted torque drops below the limit torque and stepper motor 19 is ready to return to a free-wheeling mode. A position transducer 27 is operably associated with control linkage 15 to provide position data for control linkage 15. In addition, a stick shaker 29 may be optionally attached to collective 21 to provide an additional tactile cue. As is shown, stepper motor 19, microswitch 25, position transducer 27, and stick shaker 29 are all coupled to a system computer 31.

Figures 3, 5:
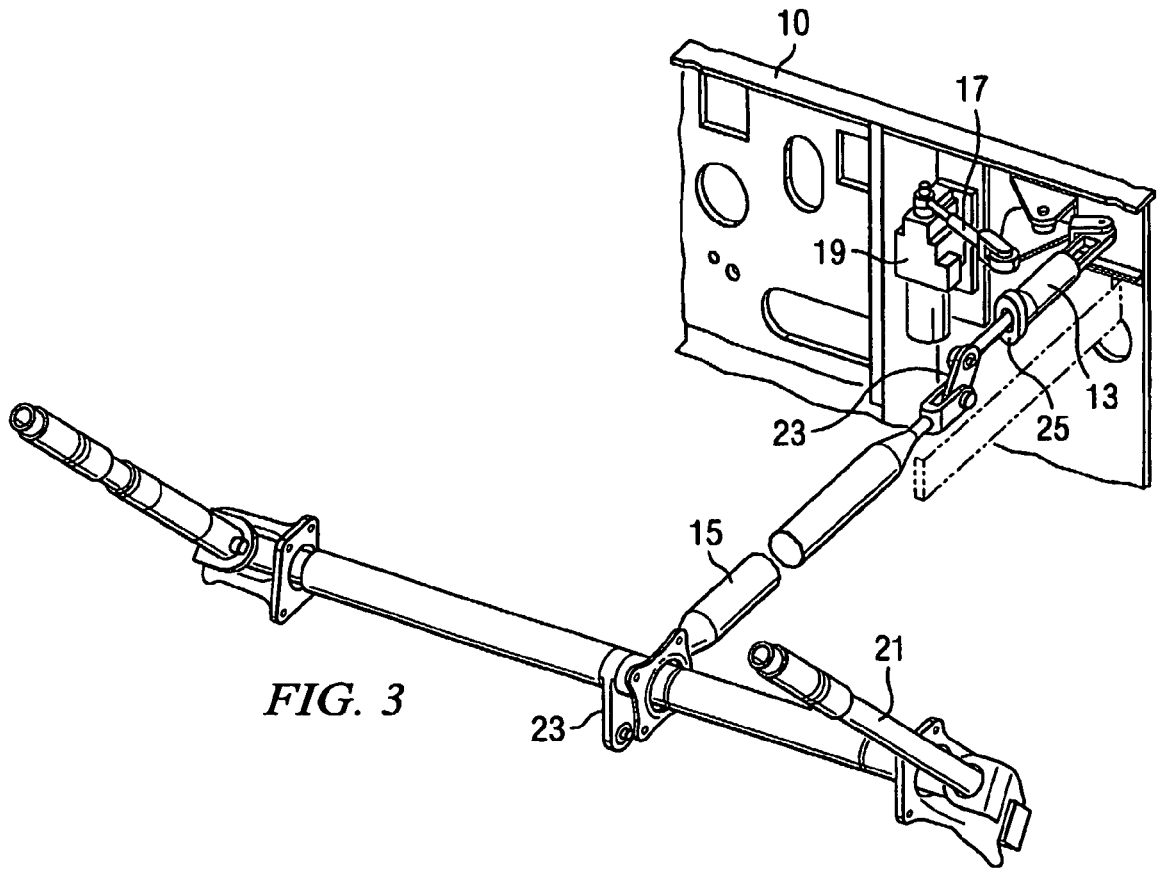
FIG. 3 is an exemplary configuration of the simplified representation of the tactile cueing system according to the present invention.
FIG. 5 is a table of flight data parameters used by the tactile cueing system according to the present invention.

Referring now to FIG. 3 in the drawings, one exemplary configuration of the simplified representation of tactile cueing system 11 of FIG. 2 is illustrated. In the preferred embodiment, spring cartridge 13, control linkage 15, stepper motor 19, mixing lever 23, and microswitch 25 are disposed beneath the cabin floor of aircraft 10.

Figure 4:
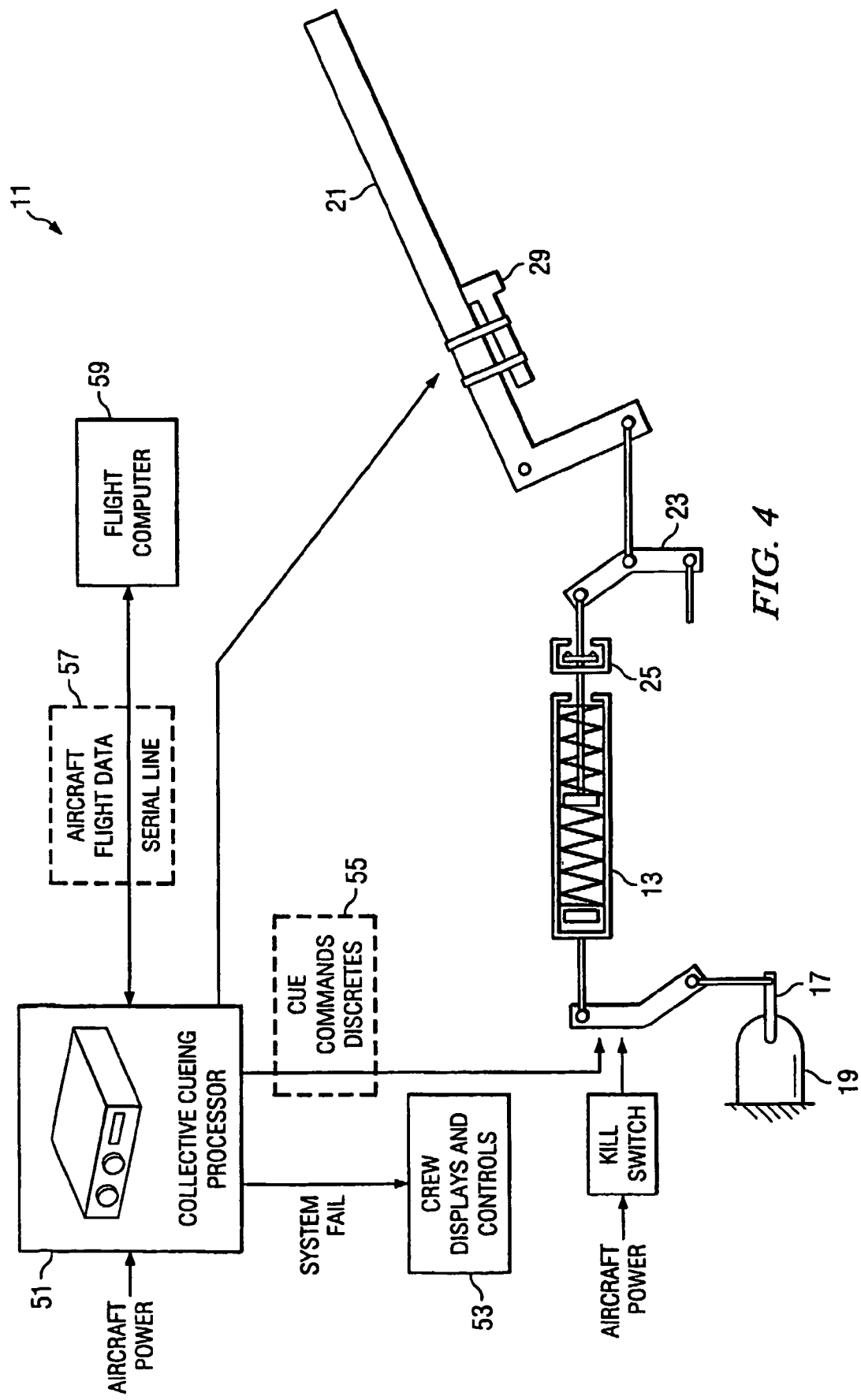
FIG. 4 is a detailed schematic of the tactile cueing system according to the present invention.

Referring now to FIG. 4 in the drawings, tactile cueing system 11 is shown in a more detailed schematic. FIG. 4 illustrates the inter-relation of tactile cueing system 11 to other control systems of aircraft 10. Tactile cueing system 11 is controlled by a collective cueing processor (CCP) 51 that is powered by aircraft 10. If aircraft 10 includes a HUMS, it is preferred that the central processing unit (CPU) from the HUMS be used to perform the processing functions of CCP 51. This is the configuration illustrated in FIG. 4. In such applications, CCP 51 is preferably based on the HUMS Processor Module (HPM) available from Smiths Aerospace Electronic Systems. If aircraft 10 does not include a HUMS, then CCP 51 may comprise a stand alone unit. In addition, the processing functions of CCP 51 may be performed by a flight control computer 59, provided aircraft 10 includes such a flight control computer 59, and that flight control computer 59 has sufficient computing capacity to perform the processing functions of CCP 51. Of course, it will be appreciated that CCP 51 may also be a stand alone unit in applications in which aircraft 10 includes a HUMS. In the preferred embodiment, an additional interface card 55 to drive the high-current cueing devices, such as stepper motor 19, stick shaker 29, and warning lights 53, is integrated into tactile cueing system 11.

The HPM is preferably a 603$e$ PowerPC processor based system with serial and discrete input/output capability. As well as having specialized avionics interface devices, the HPM is also fitted with four universal asynchronous receiver/transmitter (UART) serial interfaces 57, over which the HPM receives data from aircraft flight control computers 59.

Interface card 55 is used to enable CCP 51 to generate discrete output signals to drive the cueing devices. Interface card 55 inverts the signals to ensure that if power is removed from CCP 51, stepper motor 19 is allowed to free wheel, stick shaker 29 and the over-torque indicator are disabled, and failure warning indicator 53 is illuminated.

CCP 51 uses flight data information from a data acquisition system of aircraft 10 to identify the aircraft flight condition and predict the torque level. When the torque is predicted to exceed the transmission limit, a cue is provided. The cue can be generated in a number of forms, including collective force cueing, a stick shaker, voice warning, or visual warning.

As the pilot operates collective 21, control linkage 15 drives one end of spring cartridge 13. When aircraft 10 is being operated within its envelope limits, the shaft of stepper motor 19 is free to move in either direction as dictated by forces applied to actuator arm 17. The forces applied to actuator arm 17 are those transmitted by spring cartridge 13 and are due to the motion of collective 21. During such time, the actual and predicted values of engine torque are below the torque limit. However, if the maximum of either the predicted or actual engine torque exceeds a selected limit, the system computer 31 directs these activities.

First, an engage flag for stepper motor 19 is set true, making stepper motor 19 act like a magnetic brake. Thus, if the pilot continues pulling up on collective 21, microswitch 25 shows its true state indicating that spring cartridge 13 is in tension. Spring cartridge 13 then supplies a resistive force consisting of a breakout force and an increasing force proportional to the amount of exceedance. Once the pilot pushes down on collective 21 releasing the spring tension, microswitch 25 changes to its false state causing stepper motor 19 to revert to free-wheeling mode, thereby removing any resistance to corrective action. When the engage flag changes to true, the current location of collective 21 is recorded and serves as an initial value for both the actual location and the commanded location of collective 21.

Second, a collective limit position (CLIP) is calculated. This calculation determines where collective 21 should be so that the torque will just equal the limit at the future time, referred to as the prediction horizon. The CLIP is measured relative to the current location of the collective position, so only a change or delta needs to be calculated. The calculation itself comes from the amount the torque exceeds the limit multiplied by the gain relating inches of collective stick to change in torque. The CLIP is then added to the commanded location for the collective step.

Third, a step command is issued to stepper motor 19. If the commanded location is below the actual location, a "down" step is issued. If the commanded location is above the actual location, an "up" step is issued. Coincident commanded and actual location issues a "zero" step. Stepper motor 19 then moves one end of spring cartridge 13 accordingly. If the pilot maintains just the breakout force on collective 21, stepper motor 19 actually drives the pilot's hand to track exactly the torque limit. If the pilot maintains collective 21 in one position, he feels the force modulate according to the degree of exceedance.

Stepper motor 19, coupled with the spring cartridge 13, applies the required cueing force. In normal operations, below the torque limit, stepper motor 19 is designed to free wheel and spring cartridge 13 does not apply force to collective 21. If a torque exceedance is predicted, stepper motor 19 is engaged and an immediate collective force cue is transmitted to the pilot. The force cue preferably consists of an 8-pound breakout force at the torque limit plus a 1.4 pound per inch force gradient. Because collective position for limit torque will vary with flight condition and maneuver requirements, the resulting position is a dynamic value that requires constant update.

Fourth, if the exceedance is greater than a selected additional increment above the limit, stick shaker 29 is activated.

These four evaluations are repeated every computational frame. The exact logic for stepper motor engagement and direction involves a truth table that uses values of torque exceedance, current and previous stepper motor engagement, and state of the microswitch.

As set forth above, an important aspect of the present invention is the fact that the corrective action by the pilot for torque exceedance, rotor droop, and exhaust gas temperature is to push collective 21 down. In order to cue against a limit exceedance on all of these parameters, the system need only determine if any exceedance exists individually. If so, tactile cueing system 11 starts the cueing process, then calculates the CLIP for each parameter that is exceeding its limit, and uses the most conservative answer.

Finally, the limits are not constants, but are instead functions of airspeed and other parameters. For instance, the torque limit changes in step fashion at a certain speed, for example $V_q$. In order to prevent a sudden change in cueing force due to a sudden change in limit value, the limit value is slowly changed as a function of airspeed proximity to $V_q$, and the rate at which the airspeed approaches $V_q$.

Flight control computers 59 provide flight data to control software residing on CCP 51, which sends applicable tactile cues to the pilot. The control software uses current control positions and aircraft flight parameters from flight control computers 59 to perform a neural network based prediction of future mast torque. A prediction using the collective rate is also possible to compensate for aggressive collective inputs. CCP 51 controls the engagement and position of stepper motor 19.

In the preferred embodiment, tactile cueing system 11 uses flight data available from a typical HUMS system to provide the required input for tactile cueing. A major cost driver for a typical FDR or HUMS installation involves the acquisition of flight data from the predominately analogue transducers found on civil rotorcraft, and the processors required to implement HUMS applications. This means that the addition of tactile cueing system 11 on an aircraft already equipped with HUMS can be achieved at minimum additional cost.

Referring now to FIG. 5 in the drawings, a table of flight data parameters is illustrated. Three separate polynomial neural networks (PNN) predict the torque simultaneously. These predictions are compared to the current torque, and a final weighted average for future torque is produced. The preferred PNNs were developed using the group method of data handling (GMDH) algorithm. A major feature of the GMDH algorithm is that it produces deterministic algebraic expressions suitable for meeting software certification requirements. Each PNN uses an independent set of flight data parameters from aircraft 10. The parameters are preferably grouped into the following categories: airframe, engine and pilot. The algorithm package has been written such that a different set of PNNs can be used depending on the current aircraft flight condition. Two exemplary flight conditions are: (1) above 40 knots; and (2) below 40 knots.

As set forth above, tactile cueing system 11 comprises a parameter prediction and a "soft-stop" tactile cue. The parameter prediction uses a computer, associated software, and sensors of control position, engine parameters, and rotor performance to predict a future value of certain parameters based upon current values. Any number of algorithms can be applied to the prediction problem, including, but not limited to, Kalman filtering, extended Kalman filtering, linear prediction, trending, multi-variable surface fits of measured data, simple analytical expressions, artificial neural networks, and fuzzy logic. Some of the sensors measure current values of air data, such as airspeed and rate of descent. Other sensors measure performance parameters, such as engine torque, exhaust gas temperature, and rotor speed. Still other sensors measure pilot inputs through control displacement and rate information. All of this sensed data is sent to the aircraft's flight control computers to prepare the data for analysis.

Based on the selected algorithm, the parameter prediction is made of a future value of the desired performance parameters. This predicted value is then passed to a soft-stop cueing algorithm. The soft-stop algorithm is a "floating ground" algorithm. This means that a fixed reference point for the position of spring cartridge 13 is not necessary. By utilizing this floating ground algorithm, additional sensors to detect the positions of either side of spring cartridge 13 are not necessary. This reduces the cost of the system and increases reliability by reducing complexity. The use of stepper motor 19 combines braking capability and precise position control of the floating ground side of spring cartridge 13 without the requirement of additional sensors.

The cueing algorithm functions as an inverse model. The maximum of the predicted torque and the measured torque is known as the test torque. The test torque is compared to the torque limit, which varies with flight condition. If the test torque rises above the torque limit, the motor engages, establishing the ground for spring cartridge 13. The pilot will feel the breakout force, and an increasing gradient force with continued upward movement of collective 21. In flight, determination of the test torque value is an ongoing process, and commands to actuate stepper motor 19 are continuously computed in order to drive the cue to correspond with the limit collective position. If the pilot lowers collective 21, decreasing the torque, stepper motor 19 is disengaged and becomes freewheeling. The inertia of stepper motor 19 is small enough that no appreciable inertial resistance to collective motion is detected. The control algorithm also adapts to discontinuous torque limits within the helicopter flight envelope, using a ramp that is a function of the proximity and rate of approach to the discontinuity.

Tactile cueing system 11 results in significant advantages in terms of system airworthiness considerations. During normal operation tactile cueing system 11 is transparent to the pilot. In the event of an impending torque exceedance, the pilot can still apply any required collective input by pulling through the breakout and gradient force. This is a very intuitive reaction. The use of stepper motor 19 makes the possibility of an actuator hard-over very improbable. In the event of a mechanical jam the pilot can still fly through spring cartridge 13 without objectionable collective forces.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A tactile cueing system for an aircraft having a control mechanism comprising:
   an electronic stepper motor;
   a force gradient spring coupled at one end to the stepper motor and at the other end to the control mechanism; and
   a cueing processor coupled to the stepper motor for controlling the stepper motor;
   wherein the stepper motor and the spring impart a force that immediately opposes further motion of the control mechanism if the control mechanism is moved into a position that causes or would cause the aircraft to exceed an operational limit of at least one selected operational parameter.

2. The tactile cueing system according to claim 1, wherein the force is initially a distinct and continuous breakout force that must be intentionally overcome to continue movement of the control mechanism.

3. The tactile cueing system according to claim 2, wherein the stepper motor and spring also impart an additive force that increases in proportion to the amount of exceedance beyond the onset of the breakout force.

4. The tactile cueing system according to claim 3, wherein the additive force provides a directional cue as to the direction the control mechanism should be moved to eliminate the exceedance.

5. A tactile cueing system for an aircraft having a control mechanism comprising:
   an electronic stepper motor;
   a force gradient spring coupled at one end to the stepper motor and at the other end to the control mechanism;
   a cueing processor coupled to the stepper motor for controlling the stepper motor;
   a means for sensing the actual values of each selected operational parameter of the aircraft;
   a parameter prediction algorithm programmed into the cueing processor for predicting future values of each selected operational parameter; and
   a cueing algorithm programmed into the cueing processor for comparing the actual values and the predicted future values of the operational parameters;
   wherein the stepper motor and the spring impart a tactile cue to the control mechanism if the control mechanism is moved into a position that causes or would cause the aircraft to exceed an operational limit of at least one selected operational parameter; and
   wherein the tactile cue is generated by the stepper motor and the spring based in response to an output from the cueing algorithm.

6. The tactile cueing system according to claim 5, wherein the cueing algorithm is a floating ground algorithm for which the actual absolute sensed position of either end of the spring is not required.

7. The tactile cueing system according to claim 5, wherein the parameter prediction algorithm calculates a future position of the control mechanism that correlates to a position that would cause the aircraft to exceed the operational limit of any one of the selected operational parameters, the future position being measured relative to the actual position of the control mechanism.

8. The tactile cueing system according to claim 5, further comprising:
   a switching means operably associated with the spring for preventing inadvertent movement of the control mechanism when the predicted future values of the selected operational parameters do not exceed the selected operational limits of the aircraft.

9. The tactile cueing system according to claim 5, wherein the parameter prediction algorithm includes at least one technique for estimating the future values of the operational parameters.

10. The tactile cueing system according to claim 5, wherein the parameter prediction algorithm and the cueing algorithm run continuously and periodically update during operation of the aircraft.

11. The tactile cueing system according to claim 1, wherein a single corrective movement of the control mechanism prevents the operational limits of all of the selected operational parameters from being exceeded.

12. The tactile cueing system according to claim 1, wherein the selected operational parameters include engine torque, rotor droop, and exhaust gas temperature.

13. The tactile cueing system according to claim 1, wherein the operational limits are functions of the selected operational parameters, other operational parameters, or a combination of some or all of the selected operational parameters and the other operational parameters.

14. The tactile cueing system according to claim 1, further comprising:
   a position transducer operably associated with the control mechanism for providing data on the position of the control mechanism.

15. The tactile cueing system according to claim 1, further comprising:
   a health and usage monitoring system;
   wherein the health and usage monitoring system is coupled to the cueing processor.

16. The tactile cueing system according to claim 15, wherein the health and usage monitoring system performs the processing functions of the cueing processor.

17. The tactile cueing system according to claim 1, further comprising:
   a flight control computer for controlling the aircraft;
   wherein the flight control computer is coupled to the cueing processor.

18. The tactile cueing system according to claim 17, wherein the flight control computer performs the processing functions of the cueing processor.

19. The tactile cueing system according to claim 1, wherein the stepper motor moves freely while the control mechanism is operated within the operational limits of the aircraft.

20. An aircraft comprising:
a fuselage;
a drive means carried by the fuselage;
a control mechanism for controlling the aircraft; and
a tactile cueing system coupled to the control mechanism comprising:
an electronic stepper motor;
a force gradient spring coupled at one end to the stepper motor and at the other end to the control mechanism; and
a cueing processor coupled to the stepper motor for controlling the stepper motor;
wherein the stepper motor and the spring impart a force that immediately opposes further motion of the control mechanism if the control mechanism is moved into a position that causes or would cause the aircraft to exceed an operational limit of at least one selected operational parameter.

21. An aircraft comprising:
a fuselage;
a drive means carried by the fuselage;
a control mechanism for controlling the aircraft; and
a tactile cueing system coupled to the control mechanism comprising:
an electronic stepper motor;
a force gradient spring coupled at one end to the stepper motor and at the other end to the control mechanism;
a cueing processor coupled to the stepper motor for controlling the stepper motor;
a means for sensing the actual values of each selected operational parameter of the aircraft; and
a means for predicting future values of each selected operational parameter;
wherein the stepper motor and the spring impart a tactile cue to the control mechanism if the control mechanism is moved into a position that causes or would cause the aircraft to exceed an operational limit of at least one selected operational parameter; and
wherein the tactile cue is generated by the stepper motor and the spring based upon a comparison of the actual values and the predicted future values of the operational parameters.

22. The tactile cueing system according to claim 1, wherein the position of the control mechanism associated with an onset of exceedance of the operational limit is continually and dynamically adjusted.

* * * * *